United States Patent
Zhang et al.

(10) Patent No.: US 10,831,803 B2
(45) Date of Patent: Nov. 10, 2020

(54) SYSTEM AND METHOD FOR TRUE PRODUCT WORD RECOGNITION

(71) Applicants: Beijing Jingdong Shangke Information Technology Co., Ltd., Beijing (CN); JD.com American Technologies Corporation, Mountain View, CA (US)

(72) Inventors: Ruiqiang Zhang, San Jose, CA (US); Yun Xiao, Cupertino, CA (US); Bin Li, San Jose, CA (US); Liping Zhang, Sunnyvale, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 243 days.

(21) Appl. No.: 16/046,964

(22) Filed: Jul. 26, 2018

(65) Prior Publication Data

US 2020/0034444 A1 Jan. 30, 2020

(51) Int. Cl.
   *G06F 15/16* (2006.01)
   *G06F 16/33* (2019.01)
   *G06K 9/00* (2006.01)

(52) U.S. Cl.
   CPC ..... *G06F 16/3347* (2019.01); *G06K 9/00442* (2013.01)

(58) Field of Classification Search
   None
   See application file for complete search history.

(56) References Cited

U.S. PATENT DOCUMENTS

| | | | | |
|---|---|---|---|---|
| 8,473,491 | B1* | 6/2013 | Yuksel | G06Q 10/06 707/732 |
| 2011/0167061 | A1* | 7/2011 | Li | G06F 16/50 707/728 |
| 2018/0107678 | A1* | 4/2018 | Gluck | G06F 16/1748 |

OTHER PUBLICATIONS

Ali Cevahir and Koji Murakami. Large-scale multi-class and hierarchical product categorization for an e-commerce giant. In Proc. Coling, 2016, pp. 525-535.

Jerome H. Friedman. Stochastic gradient boosting, Comput. Stat. Data Anal., 2002, 38(4): 367-378.

(Continued)

*Primary Examiner* — Alex Gofman
(74) *Attorney, Agent, or Firm* — China Science Patent & Trademark US LLC

(57) ABSTRACT

A method and system for true product word recognition using a computing device. The method includes: obtaining title words from titles of products; determining word vectors based on a word matrix, where the word matrix is constructed based on a number of cooccurrence of each of the title words and all the other title words; determining title vectors based on a title matrix, where the title matrix is constructed based on the number of cooccurrence of each of the title words and all the other title words, and the title words in each of the titles; calculating scores for the title words in corresponding one of the titles based on the corresponding word vector and title vector; and recognizing true product words of the corresponding one of the titles based on the scores.

18 Claims, 3 Drawing Sheets

(56) References Cited

OTHER PUBLICATIONS

Jung-Woo Ha, Hyuna Pyo, and Jeonghee Kim. Large-scale item categorization in e-commerce using multiple recurrent neural networks. In Proceedings of the 22nd ACM SIGKDD International Conference on Knowledge Discovery and Data Mining, 2016, pp. 107-115.
Taher H. Haveliwala. Topic-sensitive pagerank. In Proceedings of the 11th International Conference on World Wide Web, WWW '02, 2002, pp. 517-526.
Sepp Hochreiter and Jurgen Schmidhuber . . . Long short-term memory. Neural computation, 1997, 9(8): pp. 1735-1780.
A. McCallum J. Lafferty and F. Pereira. Conditional random fields: Probabilistic models for segmenting and labeling sequence data. 2001.
Alex Krizhevsky, Ilya Sutskever, and Geoffrey E Hinton. Imagenet classification with deep convolutional neural networks. In Advances in neural information processing systems, 2012, pp. 1097-1105.
Yann Lecun, Leon Bottou, Yoshua Bengio, and Patrick Haffner, Gradient-based learning applied to document recognition, 2001, pp. 306-351. IEEE Press.
Feifan Liu, Deana Pennell, Fei Liu, and Yang Liu. Unsupervised approaches for automatic keyword extraction using meeting transcripts. In Proceedings of human language technologies: The 2009 annual conference of the North American chapter of the association for computational linguistics, 2009, pp. 620-628. Association for Computational Linguistics.
Xuezhe Ma and Eduard Hovy. End-to-end sequence labeling via bi-directional lstm-cnns-crf. arXiv preprint, 2016, arXiv:1603.01354.
Andrew McCallum and Wei Li. Early results for named entity recognition with conditional random fields, feature induction and web-enhanced lexicons. 2003.
Rada Mihalcea and Paul Tarau. Textrank: Bringing order into text. In EMNLP, 2004, vol. 4, pp. 404-411.
Rada Mihalcea. Graph-based ranking algorithms for sentence extraction, applied to text summarization. In Proceedings of the ACL 2004 on Interactive Poster and Demonstration Sessions, ACLdemo '04, 2004, Stroudsburg, PA, USA. Association for Computational Linguistics.
Tomas Mikolov, Martin Karafi'at, Lukas Burget, Jan Cemock'y, and Sanjeev Khudanpur. Recurrent neural network based language model. In Interspeech, 2010, vol. 2, p. 3.
Tomas Mikolov, Kai Chen, Greg Corrado, and Jeffrey Dean, Efficient Estimation of Word Representations in Vector Space, 2013, vol. abs/1301.3781.
L. Page, S. Brin, R. Motwani, and T. Winograd. The pagerank citation ranking: Bringing order to the web. In Proceedings of the 7th International World Wide Web Conference, 1998, pp. 161-172, Brisbane, Australia.
Ana-Maria Popescu and Orena Etzioni. Extracting product features and opinions from reviews. In Natural language processing and text mining, 2007, pp. 9-28. Springer.
Duangmanee Pew Putthividhya and Junling Hu. Bootstrapped named entity recognition for product attribute extraction. In Proceedings of the Conference on Empirical Methods in Natural Language Processing, 2011, pp. 1557-1567. Association for Computational Linguistics.
Daniel Ramage, Anna N. Rafferty, and Christopher D. Manning. Random walks for text semantic similarity. In Proceedings of the 2009 Workshop on Graph-based Methods for Natural Language Processing, TextGraphs-4, 2009, pp. 23-31, Stroudsburg, PA, USA.
Uma Sawant, Vijay Gabale, and Anand Subramanian. E-fashion product discovery via deep text parsing. In Proceedings of the 26th International Conference on World Wide Web Companion, 2017, pp. 837-838. International World Wide Web Conferences Steering Committee.
Dan Shen, Jean-David Ruvini, and Badrul Sarwar. Large-scale item categorization for e-commerce. In Proceedings of the 21st ACM international conference on Information and knowledge management, 2012, pp. 595-604. ACM.
Brian Tomasik, Phyo Thiha, and Douglas Turnbull. Tagging products using image classification. In Proceedings of the 32nd international ACM SIGIR conference on Research and development in information retrieval, 2009, pp. 792-793. ACM.
Jerry Ye, Jyh-Herng Chow, Jiang Chen, and Zhaohui Zheng. Stochastic gradient boosted distributed decision trees. In Proceedings of the 18th ACM conference on Information and knowledge management, CIKM '09, 2009, pp. 2061-2064, New York, NY, USA. ACM.
Tom Zahavy, Alessandro Magnani, Abhinandan Krishnan, and Shie Mannor. Is a picture worth a thousand words? a deep multi-modal fusion architecture for product classification in e-commerce. 2016, arXiv preprint arXiv:1611.09534.
Kuo Zhang, Hui Xu, Jie Tang, and Juanzi Li. Keyword extraction using support vector machine. Advances in Web-Age Information Management, 2006, pp. 85-96.
Qi Zhang, Yang Wang, Yeyun Gong, and Xuanjing Huang. Keyphrase extraction using deep recurrent neural networks on twitter. In EMNLP, 2016, pp. 836-845.
Nianwen Xue. Chinese word segmentation as character tagging. Computational Linguistics and Chinese Language Processing, Feb. 2003, vol. 8, No. 1, pp. 29-48.

* cited by examiner

SYSTEM AND METHOD FOR TRUE PRODUCT WORD RECOGNITION

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to automatic word recognition from a text, and more particularly to system and methods for true product word recognition (TPWR) from titles of e-commerce products.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Product search plays an important role in online shopping. In order to return the most relevant items to a user in response to a search query for a product from the user, accurate understanding of a product title is crucial. A product title generally contains a plurality of product words. But in many cases, it is difficult to know what the product really is based on the raw title. For example, if a title of a product contains words "soda machine," is the product a soda or a machine selling soda? The question falls into a natural language understanding problem. Unfortunately, absence of a syntactic structure in general product titles makes it extremely difficult to solve the problem. In addition, sellers are inclined to use synonyms and popular related terms in the title to increase search page views, which makes it more difficult to accurately find the true product word from the title.

Therefore, an unaddressed need exists in the art to address the aforementioned deficiencies and inadequacies.

SUMMARY

In certain aspects, the present disclosure relates to a method for true product word recognition using a computing device. In certain embodiments, the method includes:

obtaining a plurality of title words from a plurality of titles of products;

determining a word vector based on a word matrix, wherein the word matrix is constructed based on a number of cooccurrence of each of the title words and all the other title words;

determining a title vector based on a title matrix, wherein the title matrix is constructed based on the number of cooccurrence of each of the title words and all the other title words, and the title words in each of the titles;

calculating scores for the title words in corresponding one of the titles based on the word vector and the title vector; and recognizing true product words of the corresponding one of the titles based on the scores.

In certain embodiments, the step of obtaining the plurality of title words comprises: retrieving the plurality of titles; splitting each of the titles to obtain split words; and combining split words from all the titles and removing duplicated split words to obtain the title words.

In certain embodiments, the step of determining the word vector based on the word matrix includes: calculating the word matrix using the equation (1): $X^{(t)}=(1-\alpha)MX^{(t-1)}+X^{(0)}$. In the equation (1), each of X and M is an N×N matrix with the title words as rows and columns, N is a number of the title words. A value of each element in M is a number of cooccurrence of the corresponding row title word and column title word. A value of each element in $X^{(0)}$ is 1 when corresponding row title word and column title word are the same, and is 0 when corresponding row title word and column title word are different. $\alpha$ is a damp factor in a range of 0-1. $X^{(t-1)}$ is the word matrix after t−1 times of calculation using equation (1), $X^{(t)}$ is the word matrix after t times of calculation using equation (1). The element values of the matrix X is updated in each iteration of running the equation (1), and after the iteration, a matrix $X^{(t)}$ is obtained, and each column of the matrix $X^{(t)}$ is the word vector of the title word of that column. Thus, N word vectors can be obtained from the matrix $X^{(t)}$, each of the word vectors is one of the columns of the matrix. In certain embodiments, the damp factor $\alpha$ is about 0.1-0.9. In certain embodiments, damp factor $\alpha$ is about 0.3-0.7. In one embodiment, the damp factor $\alpha$ is 0.5. In certain embodiments, the word vector for one of the title words is a column of the word matrix $X^{(t)}$ indexed with that title word. In certain embodiments, t is determined based on convergence of the matrix $X^{(t)}$. In other words, when the matrix $X^{(t)}$ is converged, the iteration of performing equation (1) will stop.

In certain embodiments, the step of determining the title vector based on the title matrix comprises: calculating the word matrix using the equation (2): $Y^{(t)}=(1-\alpha)MY^{(t-1)}+Y^{(0)}$. M is an N×N matrix with the title words as rows and columns, N is a number of the title words, and a value of each element in M is a number of cooccurrence of the corresponding column title word and row title word. Y is an N×L matrix with the title words as rows and the titles as columns. L is a number of the titles. A value of each element in $Y^{(0)}$ is 1 when one of the title words is contained in corresponding one of the titles, and is 0 when one of the title words is not contained in corresponding one of the titles. $\alpha$ is a damp factor in a range of 0-1, preferably between 0.3 and 0.7, and more preferably 0.5. $Y^{(t-1)}$ is the title matrix after t−1 times of calculation using equation (2), and $Y^{(t)}$ is the title matrix after t times of calculation using equation (2). After the matrix $Y^{(t)}$ is converged, the method stops running equation (2), and the columns of the matrix $Y^{(t)}$ are title vectors of the corresponding title words. In certain embodiments, the elements with value 0 in the matrix Y keep the value 0 during calculation using the equation (2). In certain embodiments, the damp factor $\alpha$ is in a range of 0-1, preferably between 0.3 and 0.7, and more preferably 0.5. In certain embodiments, the title vector for one of the titles is a column of the title matrix $Y^{(t)}$ indexed with that title. In certain embodiments, t is determined based on convergence of the matrix $Y^{(t)}$.

In certain embodiments, the step of calculating scores for the title words in one of the titles comprises: multiplying the word vector and the title vector using cosine similarity. For each title word (with duplication removed) in a title, a score is calculated. All non-duplicated title words in that title are ranked according to the scores. The higher the score is, the more likelihood the word is a true product word. If a title contains multiple true product words, the top ranked title words are the best candidates.

In certain aspects, the present disclosure relates to a system for true product word recognition. In certain embodiments, the system includes a computing device. The computing device has a processor and a storage device storing computer executable code. The computer executable code, when executed at the processor, is configured to:

obtain a plurality of title words from a plurality of titles of products;

determine a word vector based on a word matrix, wherein the word matrix is constructed based on a number of cooccurrence of each of the title words and all the other title words;

determine a title vector based on a title matrix, wherein the title matrix is constructed based on the number of cooccurrence of each of the title words and all the other title words, and the title words in each of the titles;

calculate scores for the title words in corresponding one of the titles based on the word vector and the title vector; and recognizing true product words of the corresponding one of the titles based on the scores.

In certain embodiments, the computer executable code is configured to obtain the plurality of title words by: retrieving the plurality of titles; splitting each of the titles to obtain split words; combining the split words from all the titles; and removing the duplicated split words to obtain the title words.

In certain embodiments, the computer executable code is configured to determine the word vector based on the word matrix by: calculating the word matrix using the equation (1): $X^{(t)}=(1-\alpha)MX^{(t-1)}+X^{(0)}$. Each of X and M is an N×N matrix with the title words as rows and columns, N is a number of the title words. A value of each element in M is a number of cooccurrence of the corresponding row title word and column title word. A value of each element in $X^{(0)}$ is 1 when corresponding row title word and column title word are the same, and is 0 when corresponding row title word and column title word are different. α is a damp factor in a range of 0-1, preferably between 0.3-0.7, and more preferably 0.5. $X^{(t-1)}$ is the word matrix after t−1 times of calculation using equation (1), and $X^{(t)}$ is the word matrix after t times of calculation using equation (1). After iteration of performing the equation (1), the columns of the matrix $X^{(t)}$ are word vectors.

In certain embodiments, the computer executable code is configured to determine the title vector based on the title matrix by: calculating the title matrix using the equation (2): $Y^{(t)}=(1-\alpha)MY^{(t-1)}+Y^{(0)}$. M is an N×N matrix with the title words as rows and columns. N is a number of the title words. A value of each element in M is a number of cooccurrence of the corresponding column title word and row title word. Y is an N×L matrix with the title words as rows and the titles as columns. L is a number of the titles. A value of each element in $Y^{(0)}$ is 1 when one of the title words is contained in corresponding one of the titles, and is 0 when one of the title words is not contained in corresponding one of the titles. α is a damp factor in a range of 0-1, preferably between 0.3 and 0.7, and more preferably 0.5. $Y^{(t-1)}$ is the title matrix after t−1 times of calculation using equation (2), and $Y^{(t)}$ is the title matrix after t times of calculation using equation (2). The columns of the matrix $Y^{(t)}$ are title vectors.

In certain embodiments, the elements with value 0 in the matrix Y keep the value 0 during calculation using the equation (2).

In certain embodiments, the computer executable code is configured to calculate scores for the title words in one of the titles by multiplying the word vectors and the corresponding title vectors using cosine similarity.

In certain aspects, the present disclosure relates to a non-transitory computer readable medium storing computer executable code. The computer executable code, when executed at a processor of a computing device, is configured to perform the method as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
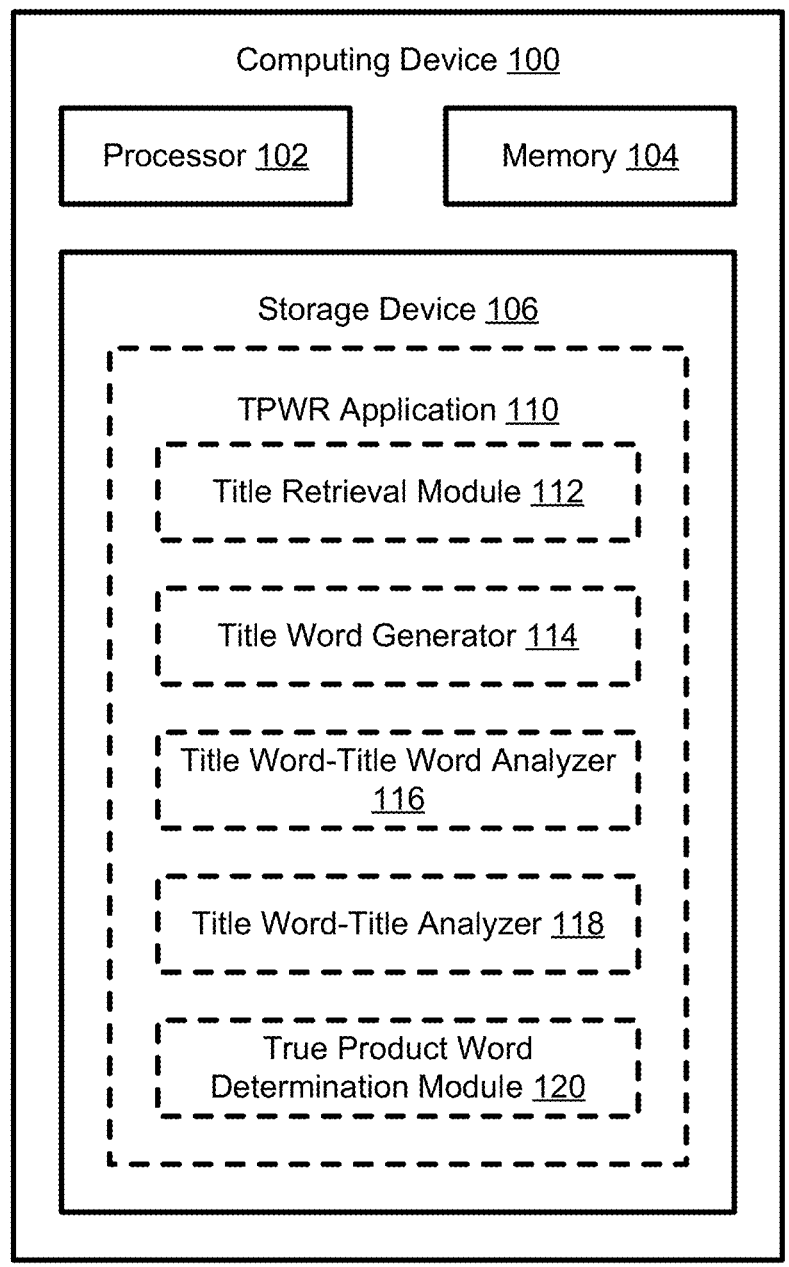
FIG. 1 schematically depicts a computing device according to certain embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term "item" is a listing of any product for sale on search result pages. The term "title words" are all the words in a product title which can be split, for example, using an algorithm. The term "product word" is a title word in a product title that names a product, which may or may not be the true product word that represents the product. Specifically, product words may be classified to two categories: "true" product words and "false" product words. A true product word is a product word in a title of the product that represents that product, i.e., what the product is really about and its selling point. A false product word in the title is used out of the above reasons and does not represent the product. False product words may cause ranking algorithm to retrieve irrelevant results. For example, if buyers search badminton racket, they may still see ankle pad in the returned results because badminton racket is a product word on the title of an ankle pad product. Product words may be defined in a product word file that lists all the product words in for example an e-commerce platform, and may be compiled manually.

Overview of the Disclosure

Currently, online shopping is more popular than ever before. In a typical online shopping scenario, users buy products by submitting queries to a search engine and then exploring the retrieved results to find the items they are interested in. Therefore, the quality of the search results plays a significant role in both user satisfaction and the profits of E-commerce companies.

Figure 3:
FIG. 3 schematically depicts an exemplary screenshot of a product item listing from a Chinese e-commerce site.

Since the total number of items in an E-commerce company's inventory could reach to billions, one search query may retrieve hundreds of millions of items. To locate a right item for the user, a highly effective and efficient ranking algorithm is crucial. A ranking algorithm typically uses hundreds or even thousands of features, and many features rely on accurate understanding of the item's title, such as product word match between query and title. However, a title of a product may contain multiple product words. Some are true product words which accurately represent the item, while the others are not. For example, a title of a product shown in FIG. 3 from a Chinese e-commerce website is as follows (with English translation in parentheses):

李宁 (Lining®) 护踝 (ankle pad) 篮球 (basketball) 足球 (soccer) 羽毛球拍 (badminton racket) 扭伤 (sprain) 运动 (exercise) 防护 (protect) 脚腕 (ankle) 保暖 (keep warm) 护脚踝 (ankle pad) 护套 (protective sleeve) 护具 (protect apparatus)

In connection with other information from the screenshot, it can be determined that the above product (item) is an ankle pad. The meaning of the title is: A Li-Ning ankle pad for playing basketball, soccer, badminton racket, preventing exercise sprain, protecting ankle, keeping warm, a protective sleeve and protect apparatus. The title contains thirteen words (title words), of them, six are product words: 护踝 (ankle pad), 篮球 (basketball), 足球 (soccer), 羽毛球拍 (badminton racket), 护套 (protective sleeve), and 护具 (protect apparatus). The true product words are three of them: 护踝 (ankle pad), 护套 (protective sleeve), and 护具 (protect apparatus). Unfortunately, sellers won't explicitly specify which are true ones. There could be various underlying reasons. Some product words are necessary to express product usage, function or attributes, such as 篮球 (basketball), 足球 (soccer), 羽毛球拍 (badminton racket); and sellers may use synonyms to increase search page views, such as synonyms of 护踝 (ankle pad), 护套 (protective sleeve) and 护具 (protect apparatus). Even more, sellers might deliberately insert popular search keywords to titles boost page views.

Many E-commerce website has special search features such as "Sort by price." The listing of items can be ordered by item price, either from low to high or reverse. The function facilitates buyers to retrieve cheaper or expensive items. Because this function disregards search relevance, many irrelevant items are shown up on top results. For example, people who want to buy "soda" may see "soda machine" products ranked higher if he/she uses "Sort by price". This causes very bad user experience. Correctly recognizing true product words can significantly prevent false product words from showing on search results.

In certain aspects, the present disclosure provide a system and method for true product word recognition (TPWR), which is based on WordSentSim (Word Sentence Similarity). Specifically, given a product titles, consisting of a sequence of words, $s=w^0, w^1, \ldots, w^N$, TPWR is configured to locate or extract the words, $w^i$, which are true product words, where i can take multiple numbers.

In certain aspects, the TPWR may use sequence-to-sequence tagging method like part of speech (POS) tagging or named identity recognition (NER), J. Lafferty and Pereira, 2001; McCallum and Li, 2003, which are incorporated herein by reference in their entirety. Given an input word sequence, sequence-to-sequence tagging makes a new output sequence by simply labelling true product words with a token "P" and other words with "NP". Sequence tagging shows good results on part-of-speech, word segmentation, named entity recognition and machine translation. However, POS tagging and NER require formal grammatical contextual information or local consistency to perform well. Because product titles usually don't adhere to a syntactic structure, it is challenging to extract product word from product title using sequence tagging. For example, when a title of an actual product from a leading e-commerce website reads "Portable badminton serving machine badminton automatic serving training no badminton collection net," the product is actually a badminton serving machine. But "badminton" as a word appears three times in the title, and the title does not follow a syntactic structure, which may confuse most of the sequence tagging algorithms and give the result of "badminton" instead of "badminton serving machine." Further, certain sequence tagging approaches require a great amount of labelled data to have better results, but it is impossible to manually generate training data for TPWR to cover hundreds of thousands of product categories.

In certain aspects, the present disclosure provide an unsupervised system and method for true product extraction named WordSentSim (word sentence similarity). This method takes advantage of big data and unique attributes of titles of e-commerce data. The method achieved much better results than some existing methods. When the method is integrated into a learning to rank system, it boosts TPWR accuracy.

In certain embodiments, WordSenSim uses random walk. Specifically, given a graph G={V, E} with edges E and nodes V, random walk models the probability distribution of nodes after walking in continuous steps, in which WordSenSim applied the following equation (1) for TPWR:

$$X^{(t)}=(1-\alpha)MX^{(t-1)}+X^{(0)} \qquad (1).$$

M is an N×N transition matrix, where N is the number of nodes in V. The values in M signifies transfer probability between two nodes in the graph. According to random walk theory, the column vectors of M must sum to one such that a node's outbound probability sums to one. $\alpha$ is a damp factor which weights between node self-transfer probability and node to neighbor transfer probability. Using $\alpha$ is to make M irreducible, which is required to make random walk converge. X is a matrix. It is the stationary solution of random walk at the time of convergence. $X^{(0)}$ is an initial probability distribution. X is normalized to one by following the convergence rule. The normalization is performed after convergence of $X^{(t)}$.

In certain embodiments, WordSentSim includes the following three steps:

Step 1, building a word semantic representation of word X. This is an N×N matrix. N is the word number of the dictionary collected from training data. Each column of the matrix X is a word's semantic representation. Column vectors of X are values of bag of words which are attached with a word of the dictionary. At start, word X is a unit matrix, where only the position representing the word is one and zeros elsewhere. When the training runs and converges, the stationary distribution of each column vector becomes word semantic representation. The column vector is real-valued numbers associated with bag of words. The word semantic representation is later used to calculate WordSentSim score for each title.

Step 2, building a title semantic representation of title X. This time X is an N×L matrix. L is the number of titles. Each column vector of title X is a title's semantic representation. For each column vector of title X, only the positions whose corresponding words are in the title take value of normalized one or zeros elsewhere. At each iteration, only the values of words that are in the title are updated, and values for those that are not in the title are kept zero. In other words, the second step only derives scores of words contained by the titles. It won't reproduce new words. This is different from the first step which generates all words' scores. This hack achieved much better results than reproducing new words. Allowing to reproduce new words generates irrelevant words to title vector. In certain embodiments, the hack is removed.

Step 3, calculating WordSentSim score corresponding to each pair of title vector and word vector which are column vectors from the above word matrix and title matrix. The previous two steps generate word vectors and title vectors. There are multiple ways to calculate distance such as described by Ramage et al., 2009, which is incorporated herewith in its entirety). In certain embodiments, cosine similarity is adopted due to its simplicity (Wikipedia, "Cosine similarity," which is incorporated herein by reference in its entirety).

In building graph G={V, E}, words are used to be nodes of V. The edges are number of co-occurrence of two words in all titles. Co-occurrence counts only once for one title even if a word may have multiple appearance. Finally, column vector of M is normalized to make sum of column vector to be one.

In the training, the iteration converges in three to four loops. The stopping criteria is set as sum of differences of weights from all nodes smaller than 0.001. In certain embodiments, α=0.5 is used, which makes convergence fast and there is no accuracy improvement by further tuning α.

In certain embodiments, stop words and very low count words are removed in building word dictionary.

IMPLEMENTATION OF THE DISCLOSURE

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

FIG. 1 schematically depicts a computing device according to certain embodiments of the present disclosure. In certain embodiments, the computing device may be a server computer, a cluster, a cloud computer, a mobile device, a tablet, a general-purpose computer, a headless computer, a wearable device, or a specialized computer, which provide TPWR. As shown in FIG. 1, the computing device 100 may include, without being limited to, a processor 102, a memory 104, and a storage device 106. In certain embodiments, the computing device 100 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 102 may be a central processing unit (CPU) which is configured to control operation of the computing device 100. The processor 102 can execute an operating system (OS) or other applications of the computing device 100. In some embodiments, the computing device 100 may have more than one CPU as the processor, such as two CPUs, four CPUs, eight CPUs, or any suitable number of CPUs.

The memory 104 can be a volatile memory, such as the random-access memory (RAM), for storing the data and information during the operation of the computing device 100. In certain embodiments, the memory 104 may be a volatile memory array. In certain embodiments, the computing device 100 may run on more than one memory 104.

The storage device 106 is a non-volatile data storage media for storing the OS (not shown) and other applications of the computing device 100. Examples of the storage device 106 may include non-volatile memory such as flash memory, memory cards, USB drives, hard drives, floppy disks, optical drives, or any other types of data storage devices. In certain embodiments, the computing device 100 may have multiple storage devices 106, which may be identical storage devices or different types of storage devices, and the applications of the computing device 100 may be stored in one or more of the storage devices 106 of the computing device 100. As shown in FIG. 1, the storage device 106 includes a TPWR application 110 ("Application"). The TPWR application 110 provides a platform for efficient true product word recognition from a large number of titles of products.

The TPWR application 110 includes, among other things, a title retrieval module 112, a title word generator 114, a title word-title word analyzer 116, a title word-title analyzer 118, and a true product determination module 120. In certain embodiments, the TPWR application 110 may include other applications or modules necessary for the operation of the modules 112-120. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some of the modules of the TPWR application 110 may be located at a remote computing device, and the modules of the TPWR application 110 in the local computing device 110 communicate with the modules in the remote computing device via a wired or wireless network.

The title retrieval module 112 is configured to retrieve or receive titles of a plurality of product. In certain embodiments, the products are stored in an e-commerce product database, and the product in the database are indexed with different features. One of the features is the title of the products. The title may be provided by the providers or sellers of the products. In certain embodiments, the title retrieval module 112 retrieves the titles of all the products in the database. In certain embodiments, the title retrieval module 112 may also retrieve titles of certain products that share certain same features or categories. After retrieval, the title retrieval module 112 sends the titles of the product to the title word generator 114, the title word-title word analyzer 116, and the title word-title analyzer 118.

The title word generator 114 is configured to, upon receiving the titles of all the products in the database, generate title words from the titles. As described above, in order to, for example, be searchable by as many queries as possible and have a high rank in a search result, the seller may add products words that are related to the product or popular key words to the title. The title may include true product words, false product words, and non-product words. The true product words, either one word or a few words, represent accurately the real product. The false product words normally refers to related products. A true product word for one product may be a false product word for another product, and vice versa. A product may have one corresponding true product word, or have several corresponding true product words, where the several corresponding true product words may be synonyms. The non-product words are not related to the identification of any product, and may include adjectives or other words used to describe certain products. In certain embodiments, the product words, which include true product words and false product words for a product, may be defined by an e-commerce company and stored as a product word list. In the example shown in FIG. 3, the title is "Lining®, ankle pad, basketball, soccer, badminton racket, sprain, exercise, protect, ankle, keep warm, ankle pad, protective sleeve, protect apparatus" (coma added between the words for clarification only), the true product words are "ankle pad," "protective sleeve," and "protect apparatus," the false product words are "basketball," "soccer," and "badminton racket," and the non-product words are "Lining®," "sprain," "exercise," "protect," "ankle," and "keep warm." The title word generator 114 is configured to split the words in each title, combine all the split words from all the titles to obtain combined split words, and remove duplicated words from the combined split words so as to obtain title words from all the titles. Then the title word generator 114 sends the obtained title words to the title word-title word analyzer 116 and the title word-title analyzer 118.

The title word-title word analyzer 116 is configured to, upon receiving the titles from the title retrieval module 112 and the title words from the title word generator 114, determine the title word-title word relationship using the equation (1):

$$X^{(t)}=(1-\alpha)MX^{(t-1)}+X^{(0)} \quad (1).$$

As shown in the following Table 1, M is an N×N transition matrix, where N is the number of title words. The title words are all the words identified from the titles (duplicated words are removed). In an e-commerce platform, the number N could be 100,000 or more. The matrix M contains N rows of title words and N columns of title words. The title word-title word analyzer 116 counts the number of titles that contains both the title word i and the title word j and defines the value of each element of the matrix M as $M_{ij}$, where $M_{ij}$ corresponds to the ith row and the jth column of the matrix. For example, when the "Title word i" and the "Title word j" are concurrent in 12 different titles, the value of $M_{ij}$ is 12.

TABLE 1

Example of matrix M with N title words.

|  | Title word 1 | Title word 2 | ... | ... | Title word j | ... | Title word N |
|---|---|---|---|---|---|---|---|
| Title word 1 | $M_{11}$ | $M_{12}$ | ... | ... | $M_{1j}$ | ... | $M_{1N}$ |
| Title word 2 | $M_{21}$ | $M_{22}$ | ... | ... | $M_{2j}$ | ... | $M_{2N}$ |
| ... |  |  | ... | ... |  |  | ... |
| Title word i | $M_{i1}$ | $M_{i2}$ | ... | ... | $M_{ij}$ | ... | $M_{iN}$ |
| ... | ... | ... | ... | ... |  | ... | ... |
| ... | ... | ... | ... | ... |  | ... | ... |
| Title word N | $M_{N1}$ | $M_{N2}$ |  |  | $M_{Nj}$ | ... | $M_{NN}$ |

As shown in the following Table 2, X is an N×N transition matrix, where N is the number of title words. The matrix X contains N rows of title words and N columns of title words. During initialization, the title word-title word analyzer 116 defines the value $X_{ii}$ as 1 and all the other X value as 0 for the matrix $X^{(0)}$.

TABLE 2

Example of matrix $X^{(0)}$ with N title words.

|  | Title word 1 | Title word 2 | ... | Title word i | ... | Title word N |
|---|---|---|---|---|---|---|
| Title word 1 | 1 | 0 | 0 | 0 | 0 | 0 |
| Title word 2 | 0 | 1 | 0 | 0 | 0 | 0 |
| ... | 0 | 0 | 1 | 0 | 0 | 0 |

TABLE 2-continued

Example of matrix $X^{(0)}$ with N title words.

|  | Title word 1 | Title word 2 | ... | Title word i | ... | Title word N |
|---|---|---|---|---|---|---|
| Title word i | 0 | 0 | 0 | 1 | 0 | 0 |
| ... | 0 | 0 | 0 | 0 | 1 | 0 |
| Title word N | 0 | 0 | 0 | 0 | 0 | 1 |

α is a damp factor which weights between node self-transfer probability and node to neighbor transfer probability. The value α is in a range of 0-1. In certain embodiments, the value α is 0.1, 0.2, 0.3, 0.4, 0.5, 0.6. 0.7, 0.8 or 0.9. In certain embodiments, the value α is in a range of 0.4-0.6. In one embodiment, the value of α is 0.5.

t is the number of calculations of the equation (1) until the element values of matrix X are converged. In certain embodiments, t is in a range of 2-20. In certain embodiments, t is about 3-8. In certain embodiments, the number t is 3 or 4. In certain embodiments, the number t is a predetermined number. In certain embodiments, the title word-title word analyzer 116 determines the number t by comparing $X^{(t-1)}$ with $X^{(t)}$, and stops the iteration of equation (1) when the value difference between $X^{(t-1)}$ and $X^{(t)}$ is less than a threshold. Here the value may be an average value, that is, difference values for each element in the two iterations are averaged; or a largest value, that is, one of the difference values from all the elements that is the largest. In certain embodiments, the threshold is in a range of 0.0-0.3. In certain embodiments, the threshold is in a range of 0.0-0.2. In one embodiment, the threshold is 0.01, and in the other embodiment, the threshold is 0.001.

After t times of iteration by performing equation (1), the title word-title word analyzer 116 obtains a converged matrix $X^{(t)}$. In the matrix $X^{(t)}$, value of each element represents the correlation between the row title word and column title word of that matrix element. In certain embodiments, each column title word has values in that column, that is, N element values in the same column, and the title word-title word analyzer 116 provide a column vector for that column title word, which is N dimensions. For example, for the produce word i, the title word-title word analyzer 116 defines a corresponding column title word vector as $P_i=(N_{1i}, N_{2i}, N_{3i}, \ldots, N_{ii}, \ldots, N_{Ni})$, where $N_{ji}$ is the element value along that column.

In certain embodiments, after convergence of the matrix $X^{(t)}$, each of the column vectors of the matrix $X^{(t)}$ is normalized to 1. Then, the title word-title word analyzer 116 sends the normalized matrix $X^{(t)}$ to the true product word determination module 120.

The title word-title analyzer 118 is configured to, upon receiving the titles from the title retrieval module 112 and the title words from the title word generator 114, determine the title word-title word relationship using the equation (2):

$$Y^{(t)}=(1-\alpha)MY^{(t-1)}+Y^{(0)} \quad (2).$$

The equation (2) is basically the same as the equation (1) except that the matrix X is replaced with matrix Y. The matrix M is the same as that of equation (1), which is an N×N transition matrix. N is the number of title words. The title word-title analyzer 118 counts the number of titles that contains both the title word i and the title word j and defines the value of the element $M_{ij}$ using that counted number.

The damp factor α in the equation (2) has the same meaning as the damp factor α in the equation (1). The value α is in a range of 0-1. In certain embodiments, the value α is 0.1, 0.2, 0.3, 0.4, 0.5, 0.6. 0.7, 0.8 or 0.9. In certain embodiments, the value α is in a range of 0.4-0.6. In one embodiment, the value of α is 0.5. The number tin equation (2) has the same meaning as the number t in the equation (1), which is the number of calculations of the equation (2) until the element values of matrix Y are converged. In certain embodiments, t is in a range of 2-20. In certain embodiments, t is about 3-8. In certain embodiments, the number t is 3 or 4. In certain embodiments, the number t is a predetermined number. In certain embodiments, the title word-title analyzer 118 determines the number t by comparing $Y^{(t-1)}$ with $Y^{(t)}$, and stops the iteration of equation (2) when the value difference between $Y^{(t-1)}$ and $Y^{(t)}$ is less than a threshold. Here the value may be an average value, that is, difference values for each element in the two iterations are averaged; or a largest value, that is, one of the difference values from all the elements that is the largest. In certain embodiments, the threshold is in a range of 0.0-0.3. In certain embodiments, the threshold is in a range of 0.0-0.2. In one embodiment, the threshold is 0.01, and in the other embodiment, the threshold is 0.001.

As shown in the following Table 3, Y is an N×L transition matrix, where N is the number of title words and L is the number of titles. The matrix Y contains N rows of products words and L columns of product titles. During initialization, the title word-title analyzer 118 defines the value $Y_{ij}$ as 1 if the title j contains the title word i, and defines the value $Y_{ij}$ as 0 if the title j doesn't contain the title word i for the matrix $Y^{(0)}$. For example, the title 1 contains title words 1 and 2, title 2 contains title words 1 and i, title j contains title word i, title L contains title words N.

TABLE 3

Example of matrix $Y^{(0)}$ with N title words and L titles.

|  | Title 1 | Title 2 | ... | Title j | ... | Title L |
|---|---|---|---|---|---|---|
| Title word 1 | 1 | 1 | ... | 0 | ... | 0 |
| Title word 2 | 1 | 0 | ... | 0 | ... | 0 |
| ... | ... | ... | ... | ... | ... | ... |
| Title word i | 0 | 1 | ... | 1 | ... | 0 |
| ... | ... | ... | ... | ... | ... | ... |
| Title word N | 0 | 0 | ... | 0 | ... | 1 |

During the first calculation using the equation (2), the title word-title analyzer 118 keeps the values 0 for all the element having the value 0, and only update the values of the elements having the value 1. Then in the following iterations, the title word-title analyzer 118 keeps the values 0 for all the element having the value 0, and only update the values of the elements having the value greater than 0. That is, the title word-title analyzer 118 only updates the elements having the starting value of 1 during the iterations.

After t times of iteration by performing equation (2), the title word-title analyzer 118 obtains a converged matrix $Y^{(t)}$. In the matrix $Y^{(t)}$, value of each element represents the correlation between the row title word and column title of that matrix element. In certain embodiments, each column title has values in that column, that is, N element values in the same column, and the title word-title analyzer 118 provide a column vector for that column title, which is N dimensions. For example, for the title j, the title word-title analyzer 118 defines a corresponding column title vector as $T_j=(N_{1j}, N_{2j}, N_{3j}, \ldots, N_{ij}, \ldots, N_{Nj})$, where $N_{ij}$ is the corresponding element value along that column.

In certain embodiments, after convergence of the matrix $Y^{(t)}$, each of the column title vectors of the matrix $Y^{(t)}$ is normalized to 1. Then, the title word-title analyzer 118 sends the normalized matrix $Y^{(t)}$ to the true product word determination module 120.

The true product word determination module 120 is configured to, upon receiving the matrix $X^{(t)}$ from the title word-title word analyzer 116 and the matrix $Y^{(t)}$ from the title word-title analyzer 118, calculate a score for each title words in a title in regard to that title. Specifically, the matrix $X^{(t)}$ includes correlation information between each title word and all the other title words, and the correlation is represented by a column title word vector having N dimensions; the matrix $Y^{(t)}$ includes correlation information between each title and all the title words, and the correlation is represented by a column title vector having N dimensions (kindly note that the tin the matrix $X^{(t)}$ may be different from the t in the matrix $Y^{(t)}$ due to their respective convergence speed). The true product word determination module 120 then calculate the score using the corresponding title word vector and the title vector. In certain embodiments, the score for each title word vs a title is calculated using cosine similarity.

Based on the score, the true product word determination module 120 is configured to determine the product word or product words of the product. For example, a title of a product may include multiple title words, and each title word is given a score. In certain embodiments, the title word having the highest score is named the true product word. In certain embodiments, the determination of one true product word or a few product words is dependent on the following applications that uses the result.

In certain embodiments, the storage device 106 may further include other applications that uses the true product word of each title determined as described above. In certain embodiments, the true product word (or words) of each title can be used by applications of other computing devices or servers.

Figure 2:
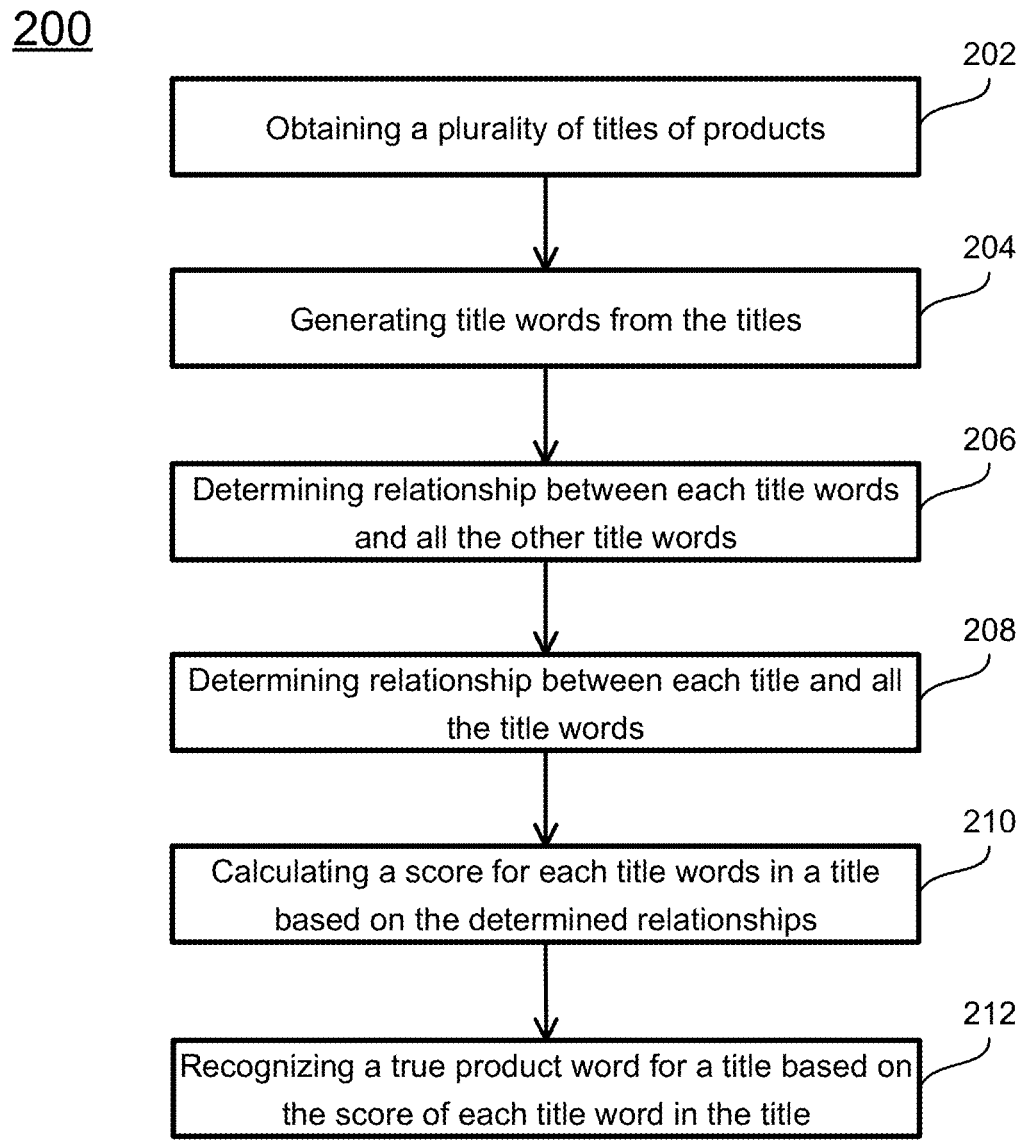
FIG. 2 schematically depicts a method for true product word recognition (TPWR) according to certain embodiments of the present disclosure.

FIG. 2 depicts a method 200 for true product word recognition according to certain embodiments of the present disclosure. In certain embodiments, the method is implemented by the computing device shown in FIG. 1. It should be particularly noted that, unless otherwise stated in the present disclosure, the steps of the method may be arranged in a different sequential order, and are thus not limited to the sequential order as shown in FIG. 2.

As shown in FIG. 2, at procedure 202, the title retrieval module 112 obtains (retrieves or receives) titles of a plurality of product from, for example, an e-commerce product database stored in a server. In certain embodiments, the product database has an index "title" to store the titles of the products, and the title retrieval module 112 queries the database to retrieve all the titles. In certain embodiments, the title retrieval module 112 may also retrieve titles of certain products that share certain same features or categories. After retrieval, the title retrieval module 112 sends the titles of the product to the title word generator 114, the title word-title word analyzer 116, and the title word-title analyzer 118.

At procedure 204, upon receiving the titles of all the products in the database, the title word generator 114 generates title words from the titles. Each of the titles may include non-product word(s) and product word(s). In certain embodiments, the title word generator 114 doesn't differentiate non-product word and product word, and all the words in the title are included for the following process. In other embodiments, an e-commerce platform may provide a product word list, and the title word generator 114 may only generate product words by comparing the words from the titles and the product word list, and extracting the matched product words. In certain embodiments, the title word generator 114 may split the titles into words, combine all the split words from all the titles, and remove duplicated words to obtain the title words. After obtaining the title words of all the titles, the title word generator 114 sends the obtained title words to the title word-title word analyzer 116 and the title word-title analyzer 118.

At procedure 206, upon receiving the titles from the title retrieval module 112 and the title words from the title word generator 114, the title word-title word analyzer 116 determines the title word-title word relationship using the equation (1). The relationship between the title words are represented by the converged matrix $X^{(t)}$. The title word vectors are columns of the converged matrix $X^{(t)}$. The title word-title word analyzer 116 then sends the matrix $X^{(t)}$ to the true product word determination module 120.

At procedure 208, upon receiving the titles from the title retrieval module 112 and the title words from the title word generator 114, the title word-title analyzer 118 determines the title word-title relationship using the equation (2). The relationship between the title words in a title and the title are represented by the converted matrix $Y^{(t)}$. The title vectors are columns of the converted matrix $Y^{(t)}$. The title word-title analyzer 118 then sends the matrix $Y^{(t)}$ to the true product word determination module 120.

At procedure 210, upon receiving the matrix $X^{(t)}$ from the title word-title word analyzer 116 and the matrix $Y^{(t)}$ from the title word-title analyzer 118, the true product word determination module 120 calculate a score for each title words in a title in regard to that title. In certain embodiments, the true product word determination module 120 calculates the score for each title word in a title using cosine similarity. Specifically, the word vector and the title vector corresponding to a title word in a title are multiplied using cosine similarity. Once the scores are calculated by cosine similarity for each of the title word in the specific title, the true product word determination module 120 then determines the true product word or true product words of the product from the title words of that title based on the scores. The true product words then can be used by a variety of applications, such as a buyer's product search on an e-commerce platform. When a buyer enters a keyword or keywords for product search, which may be the true product words or corresponding to one or more true product words. The e-commerce platform then can retrieve products for the buyer. When retrieving the products, the e-commerce platform may use the true product words of the products in the database instead of the titles of the products in the database. By the operation, the search result presented to the user is more accurate.

In certain embodiments, when the product database from the e-commerce platform is updated, the method 200 may be performed again using the new datasets.

In the above embodiments, the relationship between all the title words are considered in the process for recognizing the true product words. In other embodiments, the method may only consider the relationship between all the product words in the title, so as to recognize the true product words. Specifically, after generating title words, the method may further filter the title words by comparing them with a product word list, to obtain product words from all the titles. The matrix M and X are constructed using the product words instead of using the title words.

EXAMPLES OF THE DISCLOSURE

1. Example of Title Words

Table 4 gives four items in which 护踝 (ankle pad) is the true product word, and Table 5 gives another four items where 篮球 (basketball) is the true product word. It is hard to distinguish the two product words from one title because both 护踝 (ankle pad) and 篮球 (basketball) exist in the product titles. However, it is easier if we observe more product titles in each whole set. The more we see, the more we can clearly distinguish. In certain embodiments, the examples are extracted from a Chinese e-commerce platform, and English translation is added to aid the understanding of the disclosure. In certain embodiments, the system and method can be used in an environment with English or other languages instead of Chinese.

TABLE 4

Items with true product word of 护踝 (ankle pad)

| ITEM 1 | LP/护踝 (ankle pad)/扭伤 (sprain)/防护 (protect)/篮球 (basketball)/足球 (soccer)/运动 (exercise)/男 (male)/女士 (female)/羽毛球 (badminton)/护脚踝 (ankle pad)/CT11/脚腕 (ankle)/超薄 (super thin)/护具 (protect apparatus) |
|---|---|
| ITEM 2 | 迈克达威 (mcdavid)/护踝 (ankle pad)/运动 (exercise)/扭伤 (sprain)/防护 (protect)/崴脚 (twist ankle)/男 (male)/护脚踝 (ankle pad)/夏季 (summer)/篮球 (basketball)/护具 (protect apparatus)/mcdavid195r |
| ITEM 3 | 耐克 (NIKE)/篮球 (basketball)/护踝 (ankle pad)/扭伤 (sprain)/防护具 (protect apparatus)/绷带 (bandage)/加压 (pressurization)/弹性 (elastic)/护裸 (ankle pad)/运动 (exercise)/足球 (soccer)/透气 (permeability)/NIKE/护脚踝 (ankle pad) |
| ITEM 4 | AQ/护踝 (ankle pad)/足球 (soccer)/篮球 (basketball)/扭伤 (sprain)/防护 (protect)/跑步 (run)/脚腕 (ankle)/护具 (protect apparatus)/运动 (exercise)/男 (male)/女 (female)/绷带 (bandage)/崴脚 (twist)/固定 (fixed)/护脚踝 (ankle pad) |

TABLE 5

Items with true product word of 篮球 (basketball)

| ITEM 1 | 李宁 (Lining)/7号 (size 7)/6号 (size 6)/5号 (size 5)/篮球 (basketball)/男 (male)/女 (female)/青少年 (youth)/儿童 (child)/篮球 (basketball)/室内 (indoor)/室外 (outdoor)/防滑 (nonslip)/耐磨 (wear-resistant)/正品 (genuine) |
|---|---|

TABLE 5-continued

Items with true product word of 篮球 (basketball)

| | |
|---|---|
| ITEM 2 | 正品 (genuine)/韦伯 (webber)/5-7号 (size 5-7)/儿童 (child)/成人 (adult)/男 (male)/女 (female)/室内外 (indoor-outdoor)/篮球 (basketball)/吸湿 (hygroscopic)/软皮 (soft leather)/防滑 (nonslip)/耐磨 (wear-resistant)/比赛 (competition)/用球 (ball) |
| ITEM 3 | 斯伯丁 (Spalding ®)/篮球 (basketball)/正品 (genuine)/真皮 (leather)/手感 (hand feel)/学生 (student)/室内外 (indoor-outdoor)/比赛 (competition)/篮球 (basketball)/7号 (size 7)/水泥地 (concrete court)/耐磨 (basketball) |
| ITEM 4 | 正品 (genuine)/室外 (outdoor)/水泥地 (concrete court)/耐磨 (wear-resistant)/篮球 (basketball)/牛皮 (leather)/顺感 (Textured)/真皮 (leather)/手感 (hand feel)/软皮 (soft leather)/7号 (size 7)/学生 (student)/翻毛 (suede) |

If we aggregate word occurrences from the two set, the top five words from 护踝 (ankle pad) is 护脚踝 {(ankle pad), 运动 (exercise), 篮球 (basketball), 护踝 (ankle pad), 扭伤 (sprain)}. The top five words from 篮球 (basketball) is 篮球 {(basketball), 正品 (genuine), 耐磨 (wear-resistant), 7号 (size 7), 水泥地 (concrete court)}.

Therefore, the aggregated bag of words are different from each other. In certain embodiments, the present disclosure calculates distance between product titles and the aggregated bag of words, and recognizes true product words using the equations.

2. Data Preparation

In certain embodiments, the present disclosure relates to e-commerce platform in Chinese language. In a first module for Chinese language processing, word segmentation is performed. In certain embodiments, the present disclosure provides an in-house developed tool for word segmentation, which is specially made for E-commerce product titles. Product words are included in the segmentation dictionary, and the segmentation based on the segmentation dictionary can recognize a large amount of product words. The accuracy of the word segmentation is high enough for delivering the work according to certain embodiments of the present disclosure. In certain embodiments, the segmentation dictionary may include title words instead of product words, and the segmentation based on the segmentation dictionary can recognize a large amount of title words. In certain embodiments, the segmentation dictionary is not necessary, and the titles are split into title words using algorithms that recognize words from characters. In certain embodiments, a word segmentation according to Nianwen Xue (Chinese Word Segmentation as Character Tagging, Computational Linguistics and Chinese Language Processing, Vol. 8, No. 1, February 2003, pp. 29-48) is applied, which is incorporated herein by reference in its entirety.

In one example, the present disclosure chooses data from two product categories: "Badminton racket (羽毛球拍)" and "Clothes detergent." Table 6 shows some statistical numbers from the two categories. Table 6 lists total number of items, unique words (title words) and product words, and calculated mean, average, and maximum number of words (title words) per title, product words per title and true product words per title. The data shows that "Detergent" has 1.7 true product words in every 2.4 product words while Badminton has 1.8 in every 2.3 product words. Therefore, recognizing true product words may be easier for "Badminton" than for "Detergent." The top five frequent product words from "Badminton" are: 羽毛球拍 (badminton racket), 羽毛球 (badminton), 干胶 (overgrit), 吸汗带 (overgrit), 球拍 (racket). The top five product words from "Detergent" are: 洗衣液 (liquid detergent), 洗衣粉 (detergent powder), 柔顺剂 (softener), 洗衣皂 (laundry soap), 内衣 (underwear).

TABLE 6

Data distribution after word segmentation

| | Badminton | Detergent |
|---|---|---|
| Number of items | 12,525 | 7,623 |
| Number of unique words | 5459 | 3688 |
| Number of unique product words | 414 | 549 |
| Mean (words/title) | 15.3 | 13 |
| Average (words/title) | 15.7 | 15 |
| Max (words/title) | 34 | 32 |
| Mean (product words/title) | 2 | 2 |
| Average (product words/title) | 2.3 | 2.4 |
| Max (product words/title) | 9 | 10 |
| Mean (true product words/title) | 1 | 1 |
| Average (true product words/title) | 1.8 | 1.7 |
| Max (true product words/title) | 3 | 3 |

For the 20,000 test data, all the true product words in the titles are manually labeled. When multiple true product words are available in a title, all these true product words are tagged. In certain embodiments, those product words that partially describe the product but don't exactly match the product are also labelled as true product words, so as to increase search coverage. For example, if a product item is a microwave detergent, "微波炉清洁剂 (microwave detergent)," there are three possible product words: "微波炉 (microwave)," "清洁剂 (detergent)," and "微波炉清洁剂 (microwave detergent)." The true product word is "microwave detergent." "微波炉 (microwave)" has nothing to do with detergent and so it is not a true product word. "清洁剂 (detergent)" is not equal to "microwave detergent" but it describes the dominant feature of "microwave detergent." In certain embodiments, the disclosure approves "detergent" as true product word. Disregarding "detergent" as true product word may cause low recall in product search.

3. Comparison of the Examples with Related Art

The above two datasets shown in Table 6 are analyzed by WordSentSim according to certain embodiments of the present disclosure, and are also analyzed using a few other methods, including: random pick, TFIDF, word2vec, and TextRank. The results were compared as shown in Table 7 below.

TABLE 7

Recognition accuracy of WordSentSim and selected methods.

|  | Badminton | Detergent | Combination |
|---|---|---|---|
| Random Pick | 0.77 | 0.69 | 0.74 |
| TFIDF Pick | 0.81 | 0.70 | 0.76 |
| TextRank | 0.77 | 0.80 | 0.78 |
| Word2vec1 | 0.86 | 0.69 | 0.79 |
| Word2vec2 | 0.85 | 0.71 | 0.82 |
| WordSentSim | 0.90 | 0.85 | 0.89 |

3.1 Evaluate WordSentSim with Selected Methods

A few existing related methods are implemented to compare with WordSentSim according to certain embodiments of the present disclosure. All those related methods are incorporated herein by reference in their entirety. The first one is of randomly picking a product word from candidates in titles. This method is a naive result without any intelligence. Product word candidates are known for each title based on a product word dictionary. We constraint all product words must be included in the dictionary. The true product words for each title are tagged by humans as ground truth. For each pick, probability of a correct pick equals to number of true product words of this item divided by total number of candidates. The accuracy of random pick is calculated as sum of all items' pick probability divided by number of test items. The calculation is:

$$\text{random pick accuracy} = \frac{\sum_{i=1}^{N} \frac{\#\text{ (true product words)}}{\#\text{ (total prodcut words)}}}{N},$$

where N is the total number of test items, i iterates all test items.

The second baseline method is based on TFIDF values. Word frequency is counted from test data. TFIDF method picks the most common product word—word with the highest frequency. Accuracy of TFIDF pick is number of correct pick divided by total number of items.

Word2vec builds word embedding vector, and is an unsupervised method which only requires a text corpus to train. A Word2vec is trained using the combined data in Table 6. Word2vec usually runs on big data. But we can use it because product titles have small vocabulary size. The vocabulary size of the above two categories is in range of a few thousands, and there is high similarity in titles. We choose skip-gram option. The vector size is 100. The training generated semantic vectors for every product word. After obtaining embedding vector for words, embedding vectors for titles were further obtained. We use "sum" rule in word embedding, which has been verified by the example "king−male+female=queen." The Word2vec vector of titles is obtained by aggregation of all words' vectors in the title. Two ways are used to aggregate. One weights all words equally. The second uses weights from the second step of WordSentSim, $s = \Sigma_k w_k v_k$, where $v_k$ is word's Word2vec vector and $w_k$ is weights from WordSentSim. We used cosine similarity to calculate similarity of word embedding and title embedding. The word with the highest score is true product word.

TextRank was proposed to extract key words from input texts. We downloaded the tool, extRank4ZH3, but modified to adapt to our word segmentation. We fed our test data into the tool by which we generated all product words and associated scores. The scores signify words' importance to titles. We then output for each title the word with the highest score as the true product word. TextRank scores are global scores. Two titles with the same product words have the same results even if all other words are different.

Table 7 shows comparison of WordSentSim with the above methods. The number is accuracy at top one result output by each method. Three different test sets are considered: Badminton, Detergent and combination of the two. Training of WordSentSim and TextRank were carried out for each test set while training of TFIDF and Word2vec used the combined set. Word2vec1 used equal weights and Word2vec2 used WordSentSim's weights. From the numbers we observed that Badminton was higher than Detergent in overall. We interpret it as data of Badminton have few product words than that of Detergent (see Table 6). The disambiguation on Detergent is relatively harder.

Random Pick is the naivest results. From Random Pick to WordSentSim, we found there were at least 13% to 16% improvement. All other methods perform better than Random Pick. Even with WordSentSim's weights, there is no significant improvement brought by Word2vec2 comparing to Word2vec1. Different from other methods, TextRank achieved much better results on Detergent than Badminton. WordSentSim achieved the largest improvement among all the methods. The improvement on Detergent is more than that on Badminton.

3.2 Effects of Training: Before and After

We chose α=0:5 in WordSentSim training. We have tuned for different values but found minor difference in regarding to recognition accuracy. α=0:5 can make convergence fast. The random walk converges in 3-4 iterations. We found the first iteration made the most significant gains in terms of accuracy. After the first iteration, additional iterations brought in very small gains, in 100ths if any. As stated in "Overview of the Disclosure" above, WordSentSim generated word matrix and title matrix. To illustrate effects by word matrix and title matrix before training and after training, we experimented four cross combinations: W+T, NW+T, W+NT, NW+NT. W and V indicate matrix obtained after training. NW and NV indicate matrix before training. Word matrix before training used matrix, M, word-word concurrence matrix. For title matrix, without training is the original title-word matrix with all values equal to 1.

The results are shown in table 8. The results are after cosine similarity. The combination W+V achieved the best result. All others are much worse, at the same level as Random Pick. This experiment proves that training both word vector and title vector are necessary. The results are getting worse without any one. In the table, "T only" is using title training only. The results of title vector training are directly used, skipping step 3—cosine similarity. The result is worse than W+T.

TABLE 8

Effects of training: before and after

|  | Badminton | Detergent | Combination |
|---|---|---|---|
| NW + NT | 0.80 | 0.69 | 0.76 |
| NW + T | 0.80 | 0.70 | 0.77 |
| W + NT | 0.78 | 0.68 | 0.75 |
| W + T | 0.90 | 0.85 | 0.89 |
| T only | 0.84 | 0.86 | 0.85 |

We would like to give some examples to explain the above experiments. We use Badminton as examples. In Table 9 we gave side-by-side comparison of word vector: before training and after training. This is about a product word, 羽毛球拍 (badminton racket), and its top 10 bag of words and associated scores. Certainly, the top one semantic word is the word itself. There is no difference in the scoring order of the 10 words after training except the scores. After iterations, scores of other words relatively to the top one are reduced by hundreds-fold. The learning gives much higher weights for the word itself than others. This may explain the results in Table 8 that training of word matrix makes a big difference.

TABLE 9

Word vector of badminton racket before and after iteration

| | Before training | After training |
|---|---|---|
| 羽毛球拍 (badminton racket) | 1.0 | 1.0 |
| 拍 (racket) | 0.6240 | 0.0113 |

TABLE 9-continued

Word vector of badminton racket before and after iteration

| | Before training | After training |
|---|---|---|
| 单 (single) | 0.4632 | 0.0084 |
| 全碳素 (full carbon) | 0.4200 | 0.00763 |
| 手胶 (overgrip) | 0.2739 | 0.00500 |
| 尤尼克斯 (YONEX ®) | 0.2356 | 0.0043 |
| 羽拍 (badminton racket) | 0.2257 | 0.0041 |
| YONEX ® | 0.2149 | 0.0039 |

As to title vectors, words are initialized with equal weights before training. After iterations, an example of scores is shown in Table 10. The table gives two titles. The first is a 手胶/吸汗带 (overgrit) and the second a 羽毛球拍 (badminton racket). After iteration, the algorithm assigned the highest score to the true product words, successfully recognized the true product word. Words in the table are ranked in reverse order.

TABLE 10

Title vector after title training

| Title1 | 泰昂 (taan)/TAAN/羽毛球拍 (badminton racket)/网球拍 (tennis racket)/内柄皮 (grips)/手胶 (overgrit)/吸汗带 (overgrip)/一个 (sole)/价格 (price) |
|---|---|
| BOW (bag of word) | 手胶 (overgrit): 0.0885, 吸汗带 (overgrip): 0.0872, 羽毛球拍 (badminton racket): 0.0859, 泰昂 (taan): 0.0846, TAAN: 0.0842, 网球拍 (tennis racket): 0.0820, 价格 (price): 0.0804, 一个 (sole): 0.0800, 内柄皮 (grips): 0.001, |
| Title2 | 维特斯 (Witess)/WITESS/羽毛球拍 (badminton racket)/全碳素 (full carbon)/双 (double)/拍 (racket)/情侣 (lovers)/款 (style)/拍包 (bag)/ + /手胶 (overgrit)/ + /三只 (three)/球 (balls) |
| BOW | 羽毛球拍 (badminton racket): 0.0835, 拍 (racket): 0.0822, 全碳素 (full carbon): 0.0773, 双 (double): 0.0766, 手胶 (overgrit): 0.0765, 情侣 (lovers): 0.0762, 款 (style): 0.0760, 球 (ball): 0.0756, 拍包 (bag): 0.0749, WITESS: 0.0745, 三只 (three): 0.0744, 维特斯 (Witess): 0.001 |

The step 3 calculates cosine similarity between title vector and word vector. Comparing with step 2's results, we found cosine similarity played some roles by pushing false product words down in the ranking. As shown in Table 11, after cosine similarity, "badminton racket" is ranked lower than that in step 2 in the first title. "overgrip" is ranked lower too in the second title.

TABLE 11

Results by cosine similarity

| Title 1: | 泰昂 (taan)/TAAN/羽毛球拍 (badminton racket)/网球拍 (tennis racket)/内柄皮 (grips)/手胶 (overgrit)/吸汗带 (overgrip)/一个 (sole)/价格 (price) |
|---|---|
| BOW: | 吸汗带 (overgrit): 0.0266, 手胶 (overgrip): 0.0265, 泰昂 (taan): 0.0262, TAAN: 0.0262, 网球拍 (tennis racket): 0.0254, 羽毛球拍 (badminton racket): 0.0251, 一个 (sole): 0.0247, 价格 (price): 0.0242, 内柄皮 (grips): 0.001 |
| Title2: | 维特斯 (Witess)/WITESS/羽毛球拍 (badminton racket)/全碳素 (full carbon)/双 (double)/拍 (racket)/情侣 (lovers)/款 (style)/拍包 (bag)/ + /手胶 (overgrit)/ + /三只 (three)/球 (balls) |
| BOW: | 羽毛球拍 (badminton racket): 0.0239, 拍 (racket): 0.0236, 情侣 (lovers): 0.0226, 全碳素 (full carbon): 0.0224, 双 (double): 0.0223, WITESS: 0.0222, 三只 (three): 0.0221, 款 (style): 0.0218, 手胶 (overgrit): 0.0218, 拍包 (bag): 0.0217, 球 (ball): 0.0214, 维特斯 :0.001 |

3.3 Evaluation in a Learning to Rank System

While the previous sections observed improvements brought by WordSentSim, WordSentSim is one of the dimensions in the problem of solving TPWR. There are other useful dimensions. Product listings in e-commerce site embody other attributes of the products than titles, for example, product image, category, sale attributes (price, color, size) etc. If these attributes are extracted and used as features in a learning-to-rank machine learning system, the performance of TPWR should be improved over using WordSentSim only. Our learning-to-rank system is based on Gradient Boosting Decision Tree (GBDT) (Friedman, 2002; Ye et al., 2009) model, which is incorporated herein by reference in its entirety. GBDT is a supervised regression model that optimizes labelled training samples. We consider some other features, simply described as follows.

One feature is from product image. Product image should be useful to recognize true product words. It is the most eye-striking part in FIG. 3. Buyers can recognize product words from the image even if not looking into titles. We generated the image features by CNN models (Lecun et al., 2001; Krizhevsky et al., 2012). The training can generate embedding vectors for product image. Once the product images embedding vectors are trained, product word's embedding vectors are aggregation of all product items' embedding vectors that have the same product words. A cosine similarity between product item image and product word image vector is computed. Its results are used as image feature in GBDT training.

We also used a feature from sequence-to-sequence tagging approach. Although we have explained TPWR is not a simple sequence tagging problem, we want to use its result as features in the learning-to-rank framework. Training data for sequence tagging is from user click data. If a title contains the same word as the issued queries and the product item was clicked, we tagged the word as the true product word and others as not. From the click data log we generated 20M titles to be labelled by clicks. The training data is word-segmented and part-of speech (POS) are also known. Both word and POS are used in a feature template in CRF training. We utilize the open source toolkit CRF++ (from github.com/taku910/crfpp). Test data was decoded and output words and their probability scores. The scores are used as features in GBDT.

Every product items in inventory are associated with some category. For example, "iPad" belongs to "Electronic device" category. The category can give very useful information in identifying product word. "iPad" has small chance in the category of Clothes. It is more likely to be in an electronic product title. We generate some features from statistics of category and product words.

We generated a few more features from WordSentSim results by using statistical analysis. For all words in titles, the maximum, minimum, mean and average value of WordSentSim are calculated and used as features.

Because there are 1 billion product items, WordSentSim can't run in one single machine. To run under map reduce grids, we split all 1 billion items to 10K reducers. We put items with the same category into the same reducer. Each reducer run WordSentSim algorithm independently. The final word semantic representations is aggregation of all reducers. The results of the second step is unchanged.

Other features that have not been mentioned above include number of product words in title, price tag, sale attributes, etc. In total, we generated 41 features. XGboost (https://github.com/dmlc/xgboost) was used for GBDT training. We chose "gbtree" as boosting algorithm. We set the number of trees=50, depth=6. All other parameters used default.

The GBDT system used different training and test data from the previous section. To make all product categories to be covered, six product items were sampled from each category (there are 3000 categories in total). Excluding some special categories such as Books, Software, Arts, etc. (these categories won't need TPWR), 10K items were judged and labelled by human editors. Our evaluation data contains about 600 product items, randomly from all categories. The experimental results are shown on Table 9. We use Precision and Recall as the evaluation metrics. Precision is calculated as number of correctly recognized true product words divided by total number of recognized product words. Recall is number of correctly recognized true product words divided by total number of true product words in evaluation data. One title can have multiple true product words. Recall is regarded as an important metric in product search.

Table 12 shows the effects of WordSentSim. We compare results of using WordSentSim as features with not using it. "All" is results of using all features. "All-x" is when feature "x" was removed from "All". We also give image and CRF results as compared to WordSentSim. The effects of WordSentSim are significant. Both Precision and Recall are dropped if we do not use it. WordSentSim is advantageous over image and CRF because it is unsupervised and applied to all product items in inventory. Image and CRF are available to product items which have been clicked, thus coverage is low.

TABLE 12

Using WordSentSim in GBDT

|  | Precision | Recall |
| --- | --- | --- |
| All | 93.7% | 92.6% |
| All-WordSentSim | 92.5% | 91.5% |
| All-image | 92.2% | 90.7% |
| All-CRF | 92.2% | 91.1% |

In summary, WordSentSim according to certain embodiments of the present disclosure solves the problem of recognizing true product words from product titles for product search. As an unsupervised method, WordSentSim considers non-product words and false product word to determine the true product word, and achieves relatively high accuracy by taking advantage of E-commerce unique big data.

In certain embodiments, WordSentSim can be applied to other fields in addition to true product word recognition. Basically, WordSentSim is a solution to questions that fall into asking "Is X about Y?" There are many such problems in the real world. Take another example in advertising business, WordSentSim can be used to recognize fake ads in the case that advertisers claim their ads are about a product but actually not. In certain embodiments, WordSentSim can also be used in spam detection.

In certain embodiments of the present disclosure, WordSentSim is used to recognize true product words that exist on the titles. In other embodiments, the constraints are not required. Even if a product word is not in the title, but a synonym of the true product words, it should be found too.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. Ali Cevahir and Koji Murakami. Large-scale multi-class and hierarchical product categorization for an e-commerce giant. In Proc. COLING, 2016, pp. 525-535.
2. Jerome H. Friedman. Stochastic gradient boosting. Comput. Stat. Data Anal., 2002, 38(4): 367-378.
3. Jung-Woo Ha, Hyuna Pyo, and Jeonghee Kim. Large-scale item categorization in e-commerce using multiple recurrent neural networks. In Proceedings of the 22nd ACM SIGKDD International Conference on Knowledge Discovery and Data Mining, 2016, pp. 107-115.
4. Taher H. Haveliwala. Topic-sensitive pagerank. In Proceedings of the 11th International Conference on World Wide Web, WWW '02, 2002, pp. 517-526.
5. Sepp Hochreiter and Jürgen Schmidhuber. Long short-term memory. Neural computation, 1997, 9(8): pp. 1735-1780.
6. A. McCallum J. Lafferty and F. Pereira. Conditional random fields: Probabilistic models for segmenting and labeling sequence data. 2001.
7. Alex Krizhevsky, Ilya Sutskever, and Geoffrey E Hinton. Imagenet classification with deep convolutional neural networks. In Advances in neural information processing systems, 2012, pp. 1097-1105.
8. Yann Lecun, Leon Bottou, Yoshua Bengio, and Patrick Haffner, Gradient-based learning applied to document recognition, 2001, pp. 306-351. IEEE Press.
9. Feifan Liu, Deana Pennell, Fei Liu, and Yang Liu. Unsupervised approaches for automatic keyword extraction using meeting transcripts. In Proceedings of human language technologies: The 2009 annual conference of the North American chapter of the association for computational linguistics, 2009, pp. 620-628. Association for Computational Linguistics.
10. Xuezhe Ma and Eduard Hovy. End-to-end sequence labeling via bi-directional lstm-cnns-crf. arXiv preprint, 2016, arXiv:1603.01354.
11. Andrew McCallum and Wei Li. Early results for named entity recognition with conditional random fields, feature induction and web-enhanced lexicons. 2003.
12. Rada Mihalcea and Paul Tarau. Textrank: Bringing order into text. In EMNLP, 2004, volume 4, pp. 404-411.
13. Rada Mihalcea. Graph-based ranking algorithms for sentence extraction, applied to text summarization. In Proceedings of the ACL 2004 on Interactive Poster and Demonstration Sessions, ACLdemo '04, 2004, Stroudsburg, Pa., USA. Association for Computational Linguistics.
14. Tomas Mikolov, Martin Karafi'at, Lukas Burget, Jan Cernock'y, and Sanjeev Khudanpur. Recurrent neural network based language model. In Interspeech, 2010, volume 2, page 3.
15. Tomas Mikolov, Kai Chen, Greg Corrado, and Jeffrey Dean, Efficient Estimation of Word Representations in Vector Space, 2013, volume abs/1301.3781.
16. L. Page, S. Brin, R. Motwani, and T. Winograd. The pagerank citation ranking: Bringing order to the web. In Proceedings of the 7th International World Wide Web Conference, 1998, pages 161-172, Brisbane, Australia.
17. Ana-Maria Popescu and Orena Etzioni. Extracting product features and opinions from reviews. In Natural language processing and text mining, 2007, pp. 9-28. Springer.
18. Duangmanee Pew Putthividhya and Junling Hu. Bootstrapped named entity recognition for product attribute extraction. In Proceedings of the Conference on Empirical Methods in Natural Language Processing, 2011, pp. 1557-1567. Association for Computational Linguistics.
19. Daniel Ramage, Anna N. Rafferty, and Christopher D. Manning. Random walks for text semantic similarity. In Proceedings of the 2009 Workshop on Graph-based Methods for Natural Language Processing, TextGraphs-4, 2009, pp. 23-31, Stroudsburg, Pa., USA.
20. Uma Sawant, Vijay Gabale, and Anand Subramanian. E-fashion product discovery via deep text parsing. In Proceedings of the 26th International Conference on World Wide Web Companion, 2017, pp. 837-838. International World Wide Web Conferences Steering Committee.
21. Dan Shen, Jean-David Ruvini, and Badrul Sarwar. Large-scale item categorization for e-commerce. In Proceedings of the 21st ACM international conference on Information and knowledge management, 2012, pp. 595-604. ACM.
22. Brian Tomasik, Phyo Thiha, and Douglas Turnbull. Tagging products using image classification. In Proceedings of the 32nd international ACM SIGIR conference on Research and development in information retrieval, 2009, pp. 792-793. ACM.
23. Jerry Ye, Jyh-Herng Chow, Jiang Chen, and Zhaohui Zheng. Stochastic gradient boosted distributed decision trees. In Proceedings of the 18th ACM conference on Information and knowledge management, CIKM '09, 2009, pp. 2061-2064, New York, N.Y., USA. ACM.
24. Tom Zahavy, Alessandro Magnani, Abhinandan Krishnan, and Shie Mannor. Is a picture worth a thousand words? a deep multi-modal fusion architecture for product classification in e-commerce. 2016, arXiv preprint arXiv:1611.09534.
25. Kuo Zhang, Hui Xu, Jie Tang, and Juanzi Li. Keyword extraction using support vector machine. Advances in Web-Age Information Management, 2006, pp. 85-96.
26. Qi Zhang, Yang Wang, Yeyun Gong, and Xuanjing Huang. Keyphrase extraction using deep recurrent neural networks on twitter. In EMNLP, 2016, pp. 836-845.
27. Nianwen Xue. Chinese word segmentation as character tagging. Computational Linguistics and Chinese Language Processing, Feburary 2003, Vol. 8, No. 1, pp. 29-48.

What is claimed is:

1. A method for true product word recognition using a computing device, the method comprising:
    obtaining a plurality of title words from a plurality of titles of products;
    determining a word vector based on a word matrix, wherein the word matrix is constructed based on a number of cooccurrence of each of the title words and all the other title words;
    determining a title vector based on a title matrix, wherein the title matrix is constructed based on the number of cooccurrence of each of the title words and all the other title words, and the title words in each of the titles;
    calculating scores for the title words in corresponding one of the titles based on the word vector and the title vector; and recognizing true product words of the corresponding one of the titles based on the scores, wherein the step of determining the word vector based on the word matrix comprises:

calculating the word matrix using the equation (1):

$$X^{(t)} = (1-\alpha)MX^{(t-1)} + X^{(0)} \qquad (1),$$

wherein each of X and M is an N×N matrix with the title words as rows and columns, N is a number of the title words;

wherein a value of each element in M is a number of cooccurrence of the corresponding row title word and column title word;

wherein a value of each element in $X^{(0)}$ is 1 when corresponding row title word and column title word are the same, and is 0 when corresponding row title word and column title word are different;

wherein α is a damp factor in a range of 0-1; and wherein $X^{(t-1)}$ is the word matrix after t−1 times of calculation using equation (1), $X^{(t)}$ is the word matrix after t times of calculation using equation (1), and the word vector is corresponding one of the columns of $X^{(t)}$.

2. The method of claim 1, wherein the step of obtaining the plurality of title words comprises:
retrieving the plurality of titles;
splitting each of the titles to obtain split words; and
combining split words from all the titles and removing duplicated split words to obtain the title words.

3. The method of claim 1, wherein the damp factor α is 0.5.

4. The method of claim 1, wherein the word vector for one of the title words is a column of the word matrix $X^{(t)}$ indexed with that title word.

5. The method of claim 1, wherein t is determined based on convergence of the matrix $X^{(t)}$.

6. The method of claim 1, wherein the step of determining the title vector based on the title matrix comprises:
calculating the word matrix using the equation (2):

$$Y^{(t)} = (1-\alpha)MY^{(t-1)} + Y^{(0)} \qquad (2),$$

wherein M is an N×N matrix with the title words as rows and columns, N is a number of the title words, and a value of each element in M is a number of cooccurrence of the corresponding column title word and row title word;

wherein Y is an N×L matrix with the title words as rows and the titles as columns, L is a number of the titles, a value of each element in $Y^{(0)}$ is 1 when one of the title words is contained in corresponding one of the titles, and is 0 when one of the title words is not contained in corresponding one of the titles;

wherein α is a damp factor in a range of 0-1; and wherein $Y^{(t-1)}$ is the title matrix after t−1 times of calculation using equation (2), $Y^{(t)}$ is the title matrix after t times of calculation using equation (2), and the title vector is corresponding one of the columns of $Y^{(t)}$.

7. The method of claim 6, wherein the elements with value 0 in the matrix Y keep the value 0 during calculation using the equation (2).

8. The method of claim 6, wherein the damp factor α is 0.5.

9. The method of claim 6, wherein the title vector for one of the titles is a column of the title matrix $Y^{(t)}$ indexed with that title.

10. The method of claim 6, where t is determined based on convergence of the matrix $Y^{(t)}$.

11. The method of claim 1, wherein the step of calculating scores for the title words in one of the titles comprises:
multiplying the word vector and the title vector using cosine similarity.

12. A system for true product word recognition, the system comprising a computing device, the computing device comprising a processor and a storage device storing computer executable code, wherein the computer executable code, when executed at the processor, is configured to:
obtain a plurality of title words from a plurality of titles of products;
determine a word vector based on a word matrix, wherein the word matrix is constructed based on a number of cooccurrence of each of the title words and all the other title words;
determine a title vector based on a title matrix, wherein the title matrix is constructed based on the number of cooccurrence of each of the title words and all the other title words, and the title words in each of the titles;
calculate scores for the title words in corresponding one of the titles based on the word vector and the title vector; and
recognize true product words of the corresponding one of the titles based on the scores, wherein the computer executable code is configured to determine the word vector based on the word matrix by:

calculating the word matrix using the equation (1):

$$X^{(t)} = (1-\alpha)MX^{(t-1)} + X^{(0)} \qquad (1),$$

wherein each of X and M is an N×N matrix with the title words as rows and columns, N is a number of the title words;

wherein a value of each element in M is a number of cooccurrence of the corresponding row title word and column title word;

wherein a value of each element in $X^{(0)}$ is 1 when corresponding row title word and column title word are the same, and is 0 when corresponding row title word and column title word are different;

wherein α is a damp factor in a range of 0-1; and wherein $X^{(t-1)}$ is the word matrix after t−1 times of calculation using equation (1), $X^{(t)}$ is the word matrix after t times of calculation using equation (1), and the word vector is corresponding one of the columns of $X^{(t)}$.

13. The system of claim 12, wherein the computer executable code is configured to obtain the plurality of title words by:
retrieving the plurality of titles;
splitting each of the titles to obtain split words; and
combining the split words from all the titles and removing the duplicated split words to obtain the title words.

14. The system of claim 12, wherein the computer executable code is configured to determine the title vector based on the title matrix by:
calculating the title matrix using the equation (2):

$$Y^{(t)} = (1-\alpha)MY^{(t-1)} + Y^{(0)} \qquad (2),$$

wherein M is an N×N matrix with the title words as rows and columns, N is a number of the title words, and a value of each element in M is a number of cooccurrence of the corresponding column title word and row title word;

wherein Y is an N×L matrix with the title words as rows and the titles as columns, L is a number of the titles, a value of each element in $Y^{(0)}$ is 1 when one of the title words is contained in corresponding one of the titles, and is 0 when one of the title words is not contained in corresponding one of the titles;

wherein $\alpha$ is a damp factor in a range of 0-1; and wherein $Y^{(t-1)}$ is the title matrix after t–1 times of calculation using equation (2), $Y^{(t)}$ is the title matrix after t times of calculation using equation (2), and the title vector is corresponding one of the columns of $Y^{(t)}$.

15. The system of claim 14, wherein the elements with value 0 in the matrix Y keep the value 0 during calculation using the equation (2).

16. The system of claim 12, wherein the computer executable code is configured to calculate scores for the title words in one of the titles by multiplying the word vector and the title vector using cosine similarity.

17. A non-transitory computer readable medium storing computer executable code, wherein the computer executable code, when executed at a processor of a computing device, is configured to:

obtain a plurality of title words from a plurality of titles of products;

determine a word vector based on a word matrix, wherein the word matrix is constructed based on a number of cooccurrence of each of the title words and all the other title words;

determine a title vector based on a title matrix, wherein the title matrix is constructed based on the number of cooccurrence of each of the title words and all the other title words, and the title words in each of the titles;

calculate scores for the title words in corresponding one of the titles based on the word vector and the title vector; and recognize true product words of the corresponding one of the titles based on the scores, wherein the computer executable code is configured to determine the word vector based on the word matrix by:

calculating the word matrix using the equation (1):

$$X^{(t)}=(1-\alpha)MX^{(t-1)}+X^{(0)} \quad (1),$$

wherein each of X and M is an N×N matrix with the title words as rows and columns, N is a number of the title words;

wherein a value of each element in M is a number of cooccurrence of the corresponding row title word and column title word;

wherein a value of each element in $X^{(0)}$ is 1 when corresponding row title word and column title word are the same, and is 0 when corresponding row title word and column title word are different;

wherein $\alpha$ is a damp factor in a range of 0-1; and wherein $X^{(t-1)}$ is the word matrix after t–1 times of calculation using equation (1), $X^{(t)}$ is the word matrix after t times of calculation using equation (1), and the word vector is corresponding one of the columns of $X^{(t)}$.

18. The non-transitory computer readable medium of claim 17, wherein the computer executable code is configured to obtain the plurality of title words by:

retrieving the plurality of titles;

splitting each of the titles to obtain split words; and combining the split words from all the titles and removing the duplicated split words to obtain the title words; and wherein the computer executable code is configured to determine the title vector based on the title matrix by:

calculating the title matrix using the equation (2):

$$Y^{(t)}=(1-\alpha)MY^{(t-1)}+Y^{(0)} \quad (2),$$

wherein M is an N×N matrix with the title words as rows and columns, N is a number of the title words, and a value of each element in M is a number of cooccurrence of the corresponding column title word and row title word, Y is an N×L matrix with the title words as rows and the titles as columns, L is a number of the titles, a value of each element in $Y^{(0)}$ is 1 when one of the title words is contained in corresponding one of the titles, and is 0 when one of the title words is not contained in corresponding one of the titles, $\alpha$ is a damp factor in a range of 0-1, $Y^{(t-1)}$ is the title matrix after t–1 times of calculation using equation (2), $Y^{(t)}$ is the title matrix after t times of calculation using equation (2), and the title vector is corresponding one of the columns of $Y^{(t)}$.

* * * * *